May 14, 1963     I. L. BERKOWITZ     3,089,716
FITTING FOR ATTACHING TOGETHER TUBULAR MEMBERS
Filed Feb. 4, 1960     2 Sheets-Sheet 1
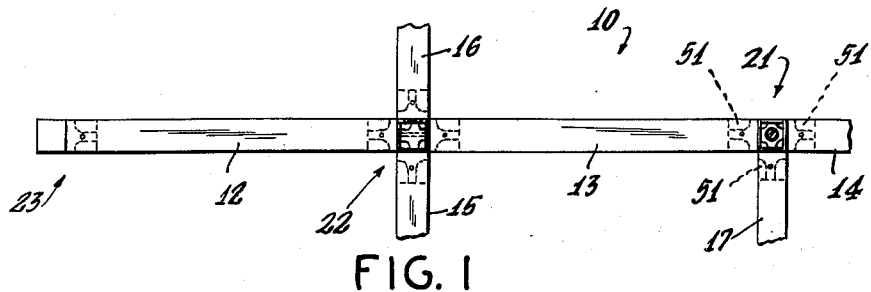
FIG. 1
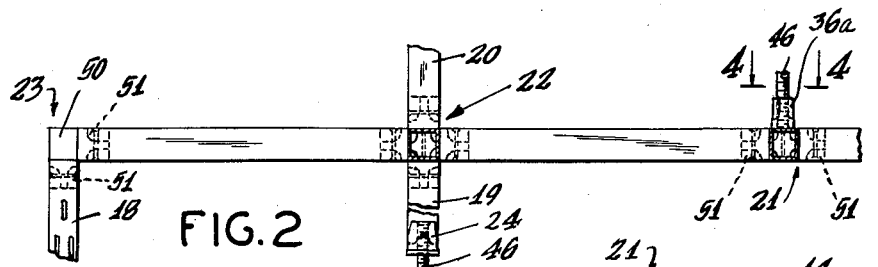
FIG. 2
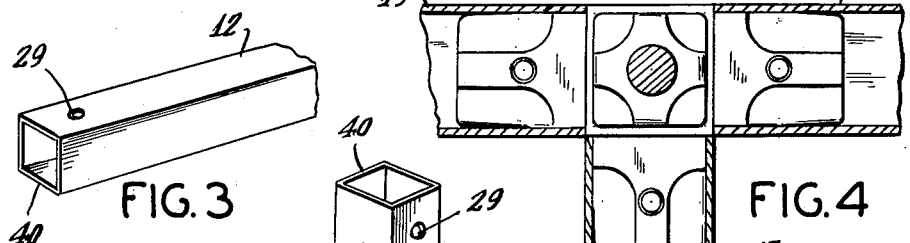
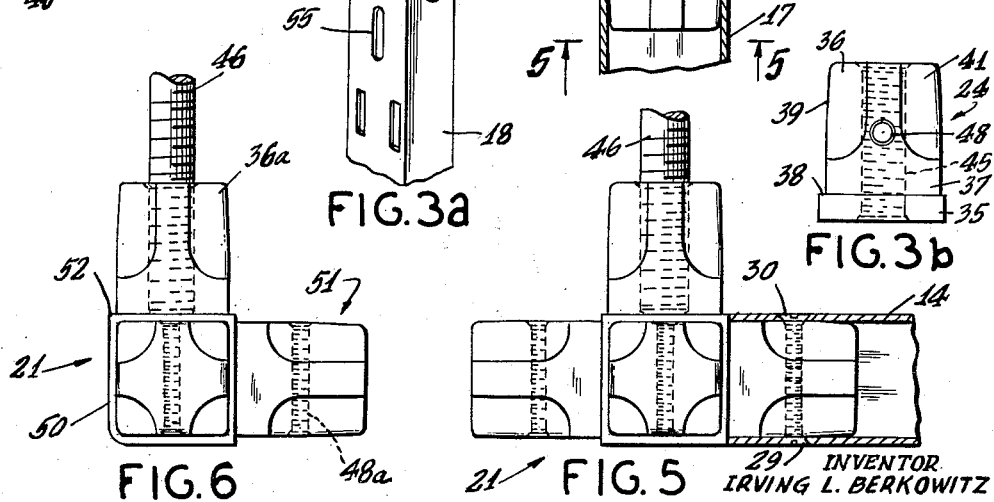
INVENTOR
IRVING L. BERKOWITZ
BY
J. B. Felshin
ATTORNEY May 14, 1963   I. L. BERKOWITZ   3,089,716
FITTING FOR ATTACHING TOGETHER TUBULAR MEMBERS
Filed Feb. 4, 1960   2 Sheets-Sheet 2

INVENTOR.
IRVING L. BERKOWITZ
BY
J. B. Felshin
ATTORNEY.

_United States Patent Office_

3,089,716
Patented May 14, 1963

3,089,716
FITTING FOR ATTACHING TOGETHER TUBULAR MEMBERS
Irving L. Berkowitz, Oceanside, N.Y., assignor, by mesne assignments, to Kason Display Hardware Inc., Brooklyn, N.Y., a corporation of New York
Filed Feb. 4, 1960, Ser. No. 6,666
2 Claims. (Cl. 287—54)

This invention relates to joint assemblies comprising fittings for attaching together tubes or tubes and screws together to build up various tables, gondolas, racks, garment carriers, stands, counters, canopies, shelves or other structures. Such fittings may comprise elbows, T's, crosses, T's with side extensions or other joints.

An object of this invention is to provide fittings of the character described for interconnecting square pipes or tubes which may be precut and preplated and formed with openings to receive attaching means, such as screws screwed into threaded transverse openings in the fitting.

Another object of this invention is to provide a fitting of the character described comprising a plug portion extending from a base provided with a shoulder to contact an end edge of a tube fitted onto the plug portion, said plug portion being formed with a longitudinal threaded opening to receive a screw threaded member.

Still another object of this invention is to provide a joint fitting of the character described comprising a cubic shaped base with one or more horizontal and/or vertical plugs projecting therefrom, each plug including a portion of square uniform cross-section and a tapered portion extending therefrom and the outer end of each plug having four corner notches.

Still another object of this invention is to provide a strong, rugged and durable device of the character described which shall be relatively inexpensive to manufacture, easy to apply and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described and of which the scope of invention will be indicated in the following claims.

In the accompanying drawings in which is shown an illustrative embodiment of this invention, FIG. 1 is a top view of a tube, screw and fitting assembly embodying the invention;

FIG. 2 is a side elevational view of the structure shown in FIG. 1;

FIG. 3 is a partial perspective view of a tube shown in FIGS. 1 and 2;

FIG. 3a is a partial, perspective view of another tube shown in FIG. 2;

FIG. 3b is a side elevational view of one type of fitting embodying the invention and shown in FIG. 1;

FIG. 4 is a cross-sectional view taken on line 4—4 of FIG. 2, with the tubes in cross-section;

FIG. 5 is a cross-sectional view taken on line 5—5 of FIG. 4;

FIG. 6 is a side elevational view of the structure of FIG. 5;

Figure 7:
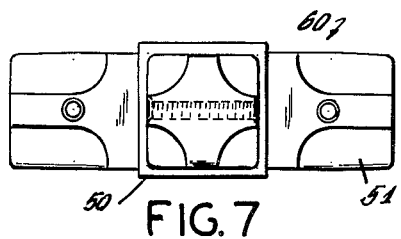
FIG. 7 is a top view of another fitting embodying the invention.

Referring now in detail to the drawing, 10 designates an assembly embodying the invention. Said assembly comprises horizontal tubes 12, 13, 14, 15, 16, 17 and vertical tubes 18, 19, 20 assembled by means of fittings 21, 22, 23, 24.

The tubes 12, 13, 14, 15, 16, 17, 18, 19, 20 are all square and may comprise welded steel with rounded corners. Each of said tubes is formed in a pair of opposite walls thereof and at predetermined length from the outer ends 40 thereof with countersunk openings 29 to receive heads of screws 30. Said tubes may be precut to size and preplated. They may be prepared in various stock lengths for use in different assemblies. They may also be stocked in different cross-sectional sizes depending on the sizes of the fittings to be used therewith, as will appear hereinafter.

The fittings may be made of zinc.

Fitting 24 (FIG. 3b) has a base 35 of square cross-section from which extends upwardly a plug portion 36. The end 37 of the plug portion 36 adjacent base 35 is of square cross section, of uniform outer dimension and smaller than the base forming an external shoulder 38. Extending from the square portion 37 is a somewhat tapered portion 39. The longitudinal corners of portion 37 are rounded. The plug portion 36 frictionally and snugly fits into one end of a tube, such as tube 15. The end edge 40 of the tube contacts shoulder 38.

Said plug portion 36 has four corner, curved notches 41. The thickness of the tube is the same as the width of shoulder 38. The length of the square portion 37 is about the same as the length of the tapered portion. The tapered portion facilitates insertion of the plug into the tube. The notches are curved transversely, and the inner ends of the notches, adjacent to square portion 37, are curved longitudinally as well as transversely. Thus, at the inner end of each notch is a concave surface which is one quarter of a sphere. The notches 41 extend into the square portion 37 of the plug. The notches reduce weight and yet retain strength.

Said fitting 24 is furthermore formed with an axial screw threaded opening 45 to receive a screw 46 which may be an adjustable leg for supporting the assembly.

Said plug portion may also be formed with a pair of aligned screw threaded openings 48 countersunk at their outer ends. Said openings 48 may communicate with axial threaded opening 45. Openings 48 are located to register with openings 29 of the tubes to permit screws 30 to be screwed thereinto. The countersink of openings 48 are complementary to the countersink of openings 29. The taper of plug portion 39 may be slight, in the order of about 1°30'.

Fitting 21 (FIGS. 4, 5, 6) comprises a central cubical block portion 50 from which extends upwardly a plug portion 36a similar to plug portion 36 of FIG. 3b to support a screw 46. Extending from the ends and front sides of block 50 are plug portions 51 likewise similar to plug portion 36 except that the axial threaded opening 45 is or may be omitted. In plug portions 51, there is a transverse screw threaded through opening 48a instead of two aligned openings 48 as in FIG. 3b. The block 50 forms shoulders 52 similar to shoulder 38 of FIG. 3b against which the end edges 40 of tubes 13, 14, 17 abut.

The tube 18 is the same as the other tubes 12, 13, etc. except that it is formed with slots 55 to receive hooks of various articles supported by said tube.

The fittings may have any number of plug portions. Thus, fitting 23 of FIGS. 1 and 2 has a block portion 50 and two plug portions 51 at right angles to one another.

Figure 9:
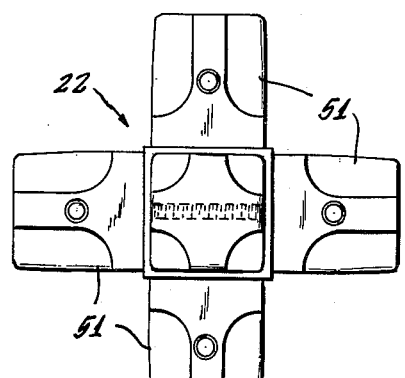
FIG. 9 is a top view of still another fitting embodying the invention.
Figure 10:
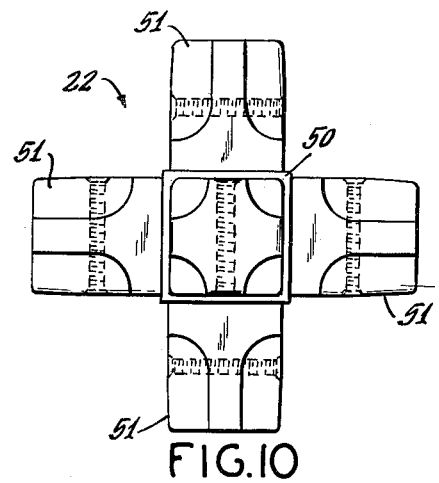
FIG. 10 is a side elevational view of the fitting shown in FIG. 9.

Fitting 22 has a central block portion and six plug portions. See FIGS. 9, 10.

Figure 8:
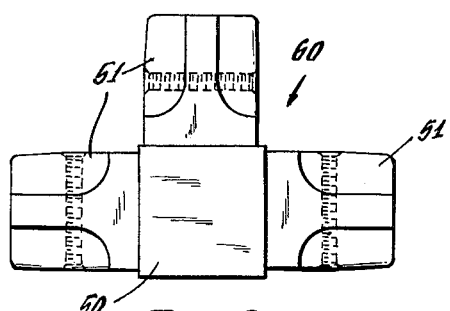
FIG. 8 is a side elevational view of the fitting shown in FIG. 7.

In FIGS. 7 and 8 there is shown a fitting 60 comprising a central block portion 50 and three plug portions 51 forming a T.

Figure 11:
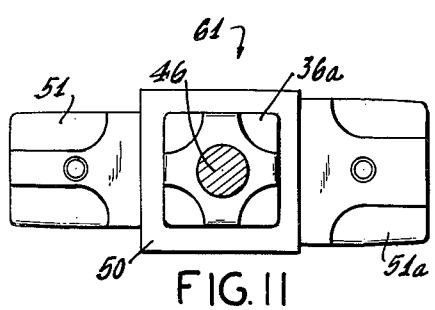
FIG. 11 is a top view of yet another fitting, embodying the invention, with a screw.
Figure 12:
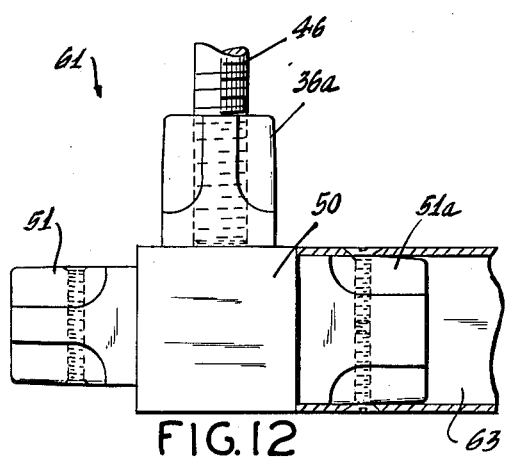
FIG. 12 is a side elevational view of the structure of FIG. 11.
Figure 13:
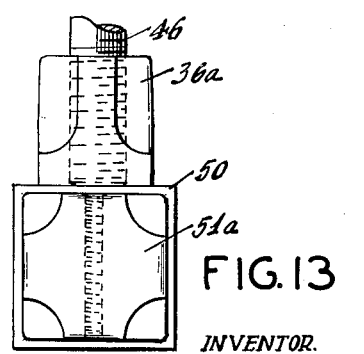
FIG. 13 is an end elevational view thereof.

In FIGS. 11 and 12 there is shown a fitting 61 which has a central cubical block portion 50, an upwardly extending plug portion 36a, a plug portion 51 and another plug portion 51a similar to plug portion 51 except that it is of larger cross-section to fit into a tube 63, similar to tubes 12, 13, etc. except that it is also of larger cross-section to correspond to the larger plug portion.

It will thus be seen that there is provided an apparatus in which the several objects of this invention are achieved, and which is well adapted to meet the conditions of practical use.

As possible embodiments might be made of the above invention, and as various changes might be made in the embodiment above set forth, it is to be understood that all matter herein set forth or shown in the accompanying drawings, is to be interpreted as illustrative and not in a limiting sense.

I claim:

1. A fitting for interconnecting hollow tubular members, said fitting comprising a solid cubic base, a solid plug extending from at least one face of said cubic base, said plug having a square portion adjacent the base, said square portion being of uniform transverse cross-section and of a smaller dimension than said base forming an external shoulder around the four sides of said square portion, a tapered portion of substantial length extending from said square portion, notches formed on the corner edges of said plug and extending from the outer end of the plug to a point spaced substantially inwardly of the outer end of the plug, said notches being of inwardly curved transverse cross-section, and the inner ends of said notches being substantially quarter sphere concave surfaces, said notches providing the plug with reinforcement against bending, the outer end of said plug portion between said notches being rounded.

2. A fitting as defined in claim 1, wherein said plug is formed with a transverse screw-threaded opening.

References Cited in the file of this patent

UNITED STATES PATENTS

| | | |
|---|---|---|
| 873,154 | Miller | Dec. 10, 1907 |
| 1,850,759 | Macneil | Mar. 22, 1932 |
| 1,917,314 | Moir | July 11, 1933 |
| 2,018,539 | Welsh | Oct. 22, 1935 |
| 2,063,895 | Mack | Dec. 15, 1936 |
| 2,281,220 | Anderson | Apr. 28, 1942 |
| 2,512,725 | Mock | June 27, 1950 |
| 2,904,360 | Gamlen | Sept. 15, 1959 |
| 2,926,941 | Thompson | Mar. 1, 1960 |
| 3,033,598 | Polger | May 8, 1962 |

FOREIGN PATENTS

| | | |
|---|---|---|
| 112,010 | Germany | Oct. 1, 1898 |
| 801,298 | Germany | Jan. 4, 1951 |
| 801,441 | Germany | Jan. 8, 1951 |